No. 633,997. Patented Oct. 3, 1899.
A. F. GROUNDMAN.
LEMON JUICE EXTRACTOR.
(Application filed Jan. 20, 1899.)
(No Model.)
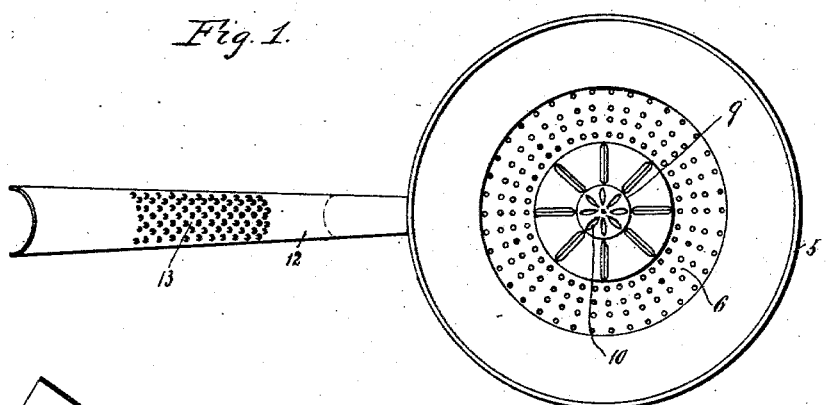
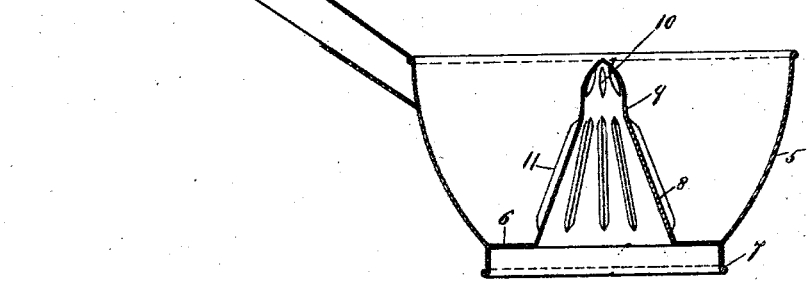
WITNESSES
John Buckler,
F. A. Stewart.
INVENTOR
Augustus F. Groundman
BY
Edgar Tate & Co
ATTORNEYS.

UNITED STATES PATENT OFFICE.

AUGUSTUS F. GROUNDMAN, OF ALBANY, NEW YORK.

LEMON-JUICE EXTRACTOR.

SPECIFICATION forming part of Letters Patent No. 633,997, dated October 3, 1899.

Application filed January 20, 1899. Serial No. 702,804. (No model.)

*To all whom it may concern:*

Be it known that I, AUGUSTUS F. GROUNDMAN, a citizen of the United States, residing at Albany, in the county of Albany and State of New York, have invented certain new and useful Improvements in a Combined Lemon-Juice Extractor and Funnel, of which the following is a full and complete specification, such as will enable those skilled in the art to which it appertains to make and use the same.

This invention relates to devices for extracting the juice of lemons; and the object thereof is to provide an improved device of this class which is also designed to serve as a strainer and funnel whereby the juice of the lemon may be poured into a bottle, a further object being to provide a device of the class above specified provided with a handle which is adapted to serve as a grater; and with these and other objects in view the invention consists in the device constructed as hereinafter described.

The invention is fully disclosed in the following specification, of which the accompanying drawings form a part, in which—

Figure 1 is a plan view of my improved combination lemon-juice extractor and funnel, and Fig. 2 a transverse section thereof.

In the drawings forming part of this specification the separate parts of my improvement are designated by the same numerals of reference in each of the views, and in the practice of my invention I provide a device of the class specified comprising a cup-shaped portion or receptacle 5, having a perforated bottom 6, below which is an annular flange or rim 7, the perimeter of which is equal to the diameter of the perforated bottom 6. The bottom 6 is provided centrally with an upwardly-directed hollow conical device 8, having a tubular conical apex 9, the conical portion of which is provided with elliptical slots or openings 10. The conical device is preferably provided with side ribs 11, and the operation of this part of the device will be clearly understood from the foregoing description when taken in connection with the accompanying drawings. Whenever it is desired to extract the juice of a lemon, the cup-shaped portion or receptacle 5 thereof is placed on a goblet or similar vessel, in which position the flange or rim 7 may surround or enter within the top of said goblet or vessel. The lemon is divided transversely of its longitudinal axis and a half thereof is forced down over the conical device 8 and turned thereon, pressure being applied thereto by the hand in this operation. In this operation the juice is extracted from the lemon and flows down through the perforated bottom 6 into a goblet or other vessel, the pith and seeds of the lemon being retained in the cup-shaped portion or receptacle 5.

Whenever it is desired to use the device as a funnel, the cup-shaped portion or receptacle 5 is inverted and the tubular conical portion 9 of the conical attachment 8 is inserted into the neck of the bottle or other vessel into which it is desired to pour the juice of the lemon. The juice of the lemon is then poured from the goblet or other vessel into the hollow conical attachment 8, which serves as a funnel, as will be readily understood.

This device is simple in construction and operation and perfectly adapted to accomplish the result for which it is intended, and it may be made of any desired material.

I also preferably provide the cup-shaped portion or receptacle 5 with a handle 12, the outer portion of which is segmental in cross-section, and said segmental portion is perforated and provided with serrations or teeth or any preferred grating-surface at 13, and by means of this construction the handle 12 is made to serve as a grater, as will be readily understood.

Having fully described my invention, I claim as new and desire to secure by Letters Patent—

1. The herein-described combination lemon-juice extractor and funnel, consisting of a cup-shaped base or receptacle having a perforated bottom, said bottom being provided with a hollow imperforate vertically-ribbed conical device having a slotted tubular extension which is adapted to be inserted into the neck of a bottle or other vessel, and whereby said device is adapted to serve as a funnel, substantially as shown and described.

2. The herein-described combination lemon-juice extractor and funnel, consisting of a cup-shaped base or receptacle having a perforated bottom, said bottom being provided with a hollow imperforate vertically-ribbed conical device having a slotted tubular extension which is adapted to be inserted into the neck of a bottle or other vessel, and whereby said device is adapted to serve as a funnel, said bottom being also provided with an annular downwardly-directed flange or rim, substantially as shown and described.

3. The herein-described combination lemon-juice extractor and funnel, consisting of a cup-shaped base or receptacle having a perforated bottom, said bottom being provided with a hollow imperforate vertically-ribbed conical device having a slotted tubular extension which is adapted to be inserted into the neck of a bottle or other vessel, and whereby said device is adapted to serve as a funnel, said bottom being also provided with an annular downwardly-directed flange or rim, and said cup-shaped portion or receptacle being provided with a handle, substantially as shown and described.

In testimony that I claim the foregoing as my invention I have signed my name, in presence of the subscribing witnesses, this 12th day of January, 1899.

AUGUSTUS F. GROUNDMAN.

Witnesses:
 THOMAS EGAN,
 GEO. H. HEMNEKE.